Figure 1:
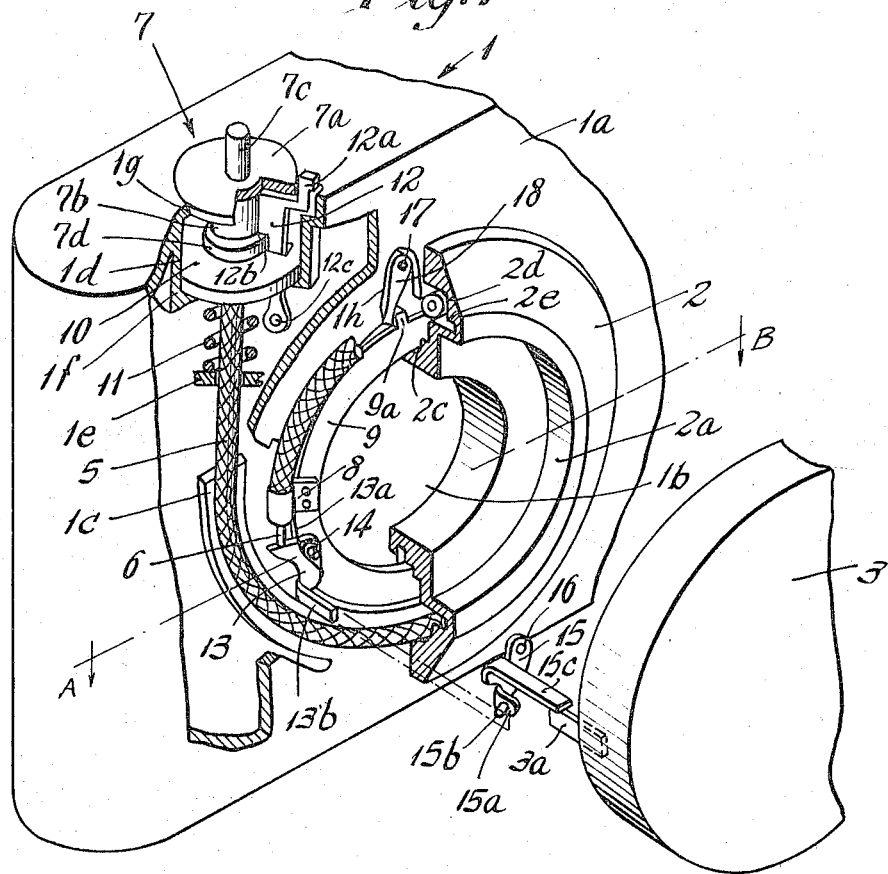

Jan. 10, 1967  F. W. R. STARP  3,296,950

PHOTOGRAPHIC CAMERA WITH A CABLE RELEASE

Filed Jan. 28, 1964

INVENTOR.
*Franz W. R. Starp*
BY
*Arthur A. March*
ATTORNEY

United States Patent Office 3,296,950
Patented Jan. 10, 1967

3,296,950
PHOTOGRAPHIC CAMERA WITH A
CABLE RELEASE
Franz W. R. Starp, Calmbach (Enz), Germany, assignor to Alfred Gauthier, G.m.b.H., Calmbach (Enz), Germany, a corporation of Germany
Filed Jan. 28, 1964, Ser. No. 340,655
Claims priority, application Germany, Jan. 30, 1963, G 36,932
6 Claims. (Cl. 95—53)

This invention relates to a photographic camera having cable releases and particularly to a photographic camera having a permanently connected cable release.

Modern cameras are usually supplied with two means for actuating the shutter: One, a shutter release trigger mounted, in most cases, directly on the camera housing, and the other a cable release which is releasably connected with the camera and is used particularly when the camera is mounted on a tripod. Ordinarily, the cable release is carried separately from the camera, with the result that it is frequently lost or is left behind so that it is not available when needed.

Cameras have been known heretofore in which the cable release was attached permanently to the camera, and it has also been known heretofore to use the cable release as the normal shutter release of the camera. But in all cases such cable releases have been mounted outside of the camera and have not been found to be commercially acceptable for the reason that they detract from the appearance of the camera.

It is the principal object of the present invention to provide a simple, inexpensive arrangement for a cable release which is attached permanently to the camera, without adversely affecting the appearance of the camera whereby the operating button at the end of the cable release may also be used as the regular shutter release trigger.

In accordance with this invention, the flexible portion of the cable release is arranged so as to retract into a guide which is either in or on the camera case. The release is firmly connected to a carrier of a lever that acts on the release member of the shutter. The carrier is movably mounted to the camera case in such a way that the lever, which is pivotally attached thereto, can act on the release member of the shutter both when the cable release is retracted and when it is extended.

When the cable release is arranged in the retractable structure according to this invention, the cable portion is completely out of sight for normal operation of the camera so that the appearance of the camera is not adversely affected, but at the same time the cable cannot be lost. Furthermore, the same button operates the shutter whether the device is used as a normal cable release or in its retracted state.

It has been found to be particularly desirable to arrange the guide for the flexible portion of the cable release in the form of an annular groove within a ring arranged coaxially with the lens axis, for example, the front plate ring of the camera case. At the same time, the carrier of the lever that acts on the release member of the shutter is preferably in the form of a ring positioned so as to be rotatable coaxially with the annular groove.

A further feature of the invention, which simplifies the structure and makes it more dependable, lies in the arrangement of the lever in such a way that the lever arm, acting on the release member of the shutter or on a transmission lever arranged ahead of the release member, goes through a radially extending rotary motion when the release button of the cable is actuated.

A further measure designed to increase the operating dependability of the device consists in having a stop associated with the ring connected to the flexible portion of the cable release. This stop is limited in its range of motion and, while permitting the ring to rotate 360° against a counter stop, fixes the respective terminal position of the cable release.

Another feature of the invention consists in providing a simple support for the handle of the cable release when it is retracted into the camera. In accordance with the invention, the support is arranged so as not to impair the appearance of the camera and, therefore, the support includes a recess, which receives the handle of the cable release, and an arresting catch which retains the handle in the recess. In order to prevent dirt or other foreign matter from penetrating into the interior of the camera case, it is another feature of the invention to provide a spring-loaded disk which is axially movably mounted within the recess to cover the open end thereof when the cable release is extended.

Figure 2:
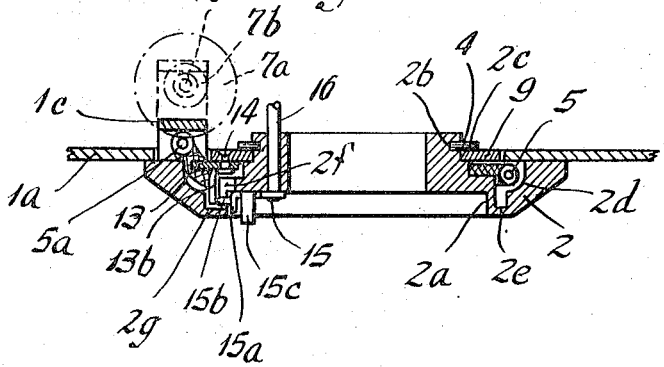

Details of the invention will become more apparent from the following specification, together with the drawing in which:

FIG. 1 shows a partial perspective view of a photographic camera case with sections removed to illustrate the interior mechanism which permits a rotatable cable release in accordance with the invention; and FIG. 2 shows a partial cross-sectional view of the front portion of the camera case of FIG. 1, split along the line A–B of FIG. 1.

In FIG. 1, reference numeral 1 refers, generally, to a case of a photographic camera having a front wall 1a provided with a circular light transmission opening 1b. A front plate ring 2 is mounted coaxially with the opening 1b and is provided with a groove or recess 2a into which an intra-lens shutter 3 can be inserted. The shutter is shown only diagrammatically in the drawing, since it is of standard construction.

The shutter 3 has a release member 3a which projects from the rear side and which is actuated by a cable release, as will be described hereinafter. According to the invention, the cable release is retracted into or on the camera case 1, so as to be invisible from the outside and the cable release forms, in its retracted state, the shutter release trigger for the intra-lens shutter.

The cable release itself is constructed in accordance with standard practice and consists mainly of a flexible member in the form of a Bowden cable release 5 with a pressure pin 6 at one end thereof connected to a movable central pressure spiral 5a and with a handle 7 at the other end. The handle comprises a sleeve 7b which is attached to the cable 5 and is provided with a centrally apertured disk 7a in which a release push rod 7c is mounted for longitudinal motion. The end of the cable 5 on which the pressure pin 6 is mounted is attached by means of a collar, or sleeve, 8 to a rotatable ring 9 that is coaxial with the opening 1b. The ring 9 is located on a collar 2c at the rear of the front plate ring 2, and is prevented from moving axially by a resilient ring 4 seated in the groove 2b.

A concentric annular groove 2d is formed in the rear surface of the ring 2 to serve as the receptacle for the cable 5 of the cable release and to guide the cable without clamping. The wall 1a, which prevents the cable from falling out of the annular groove 2d when the ring 2 is put on, comprises a stamped, inwardly bent tongue 1c which serves as the guide member at the place where the cable 5 enters the annular groove 2d.

On the top side of the case 1 is a cylindrical recess 1d which projects into the interior of the case and is so proportioned as to be capable of receiving the handle 7 when the cable release is retracted. Inserted into the recess 1d is an axially movable disk 10 through which the cable release 5 extends. The disk 10 is pushed upwardly by a spring 11 which presses against a fixed member 1e within the case 1. When the cable release is retracted, a collar 7d, which fits around a sleeve 7b on the handle 7, presses the disk 10 against the bottom 1f of the recess 1d, thereby causing a spring-loaded catch 12 to engage the collar 7d so as to retain the handle 7 within the recess and to keep the spring 11 compressed. The catch 12 is pivotally mounted on a fixed pin 12c within the case 1. The catch comprises an outwardly projecting finger piece 12a which, when pressed outwardly removes the catch from engagement with the collar 7d, thus releasing the handle 7. After the handle has been released, the spring 11 presses the disk 10 along with the handle 7 upwardly, so that the cable release can be extracted from the case 1 by pulling the disk 7a. This frees the disk 10 to move up against a collar 1g at the upper end of the recess 1d, so as to close the recess in order to prevent dust or dirt, or other foreign matter, from getting into the camera case 1 when the cable release is in its extended position. In order to operate the shutter, the button 7c of the handle 7 is depressed, which causes the pressure pin 6 to push against a lever 13 which, in turn, actuates the release member 3a of the shutter 3. The lever 13 is pivotally mounted on a pin 14 on the ring 9 and is urged clockwise by a spring 13a which keeps it in contact with the pressure pin 6. The lever 13 has an arm 13b which extends, generally, parallel to the lens axis and which is located in an extension 2e of the annular groove 2d. In addition, the front plate ring 2 has a turned groove, or hole, 2f opposite the arm 13b and into which the lever arm 13b is free to move during the counterclockwise release motion.

A transmission lever 15 is associated with the lever 13 and is rotatably mounted on a pin 16 on the front plate ring 2, as may be seen in FIG. 2. The lever 15 has a lug 15a bent-off approximately perpendicularly to the remainder of the lug and provided with a pin 15b which passes through a perforation 2g of the front plate ring 2. The pin 15b is located in the path of motion of the lever arm 13b. Another lug 15c is also bent-off on the main body of the lever 15 and rests on the release member 3a of the shutter 3, thus causing an operative connection between the cable release and the camera shutter.

The above-described release device operates in the following manner.

FIG. 1 shows the cable release in its retracted state, in which a good portion of the cable 5 is within the annular groove 2d, while the handle 7 is seated in the recess 1d of the camera case 1. If, at this time, the release trigger, or push rod, 7c is depressed, it will cause the pin 6 to press against the lever 13 and pivot the lever counterclockwise. This causes the arm 13b to rotate the lever 15 counterclockwise, which, in turn, presses the release member 3a downwardly thereby actuating the shutter 3.

While the release device may be used in this manner for taking photographs when the camera is held in the hand, the cable release will normally be extracted from the camera for taking photographs with the camera mounted on a tripod. In order to extract the cable release, the finger piece 12a must be moved so as to remove the edge 12b from engagement with the collar 7d. Thereupon the spring 11 will cause the handle 7 to jump out of the recess 1d and simultaneously will cause the disk 10 to move up into position to cover the recess 1d. The cable release may now be further extracted by pulling the disk 7a until a stop (to be described hereinafter) prevents the release from being extracted any further. As the cable release it being extracted, the cable 5 slides in the annular groove 2d while the ring makes a full turn of 360°. This brings the lever 13 back into the same position that it occupies when the cable release is in its retracted state; thereby permitting the same engagement to take place between the arm 13b and the pin 15b of the lever 15.

The stop for the ring 9 includes a lever 18 which is pivotally mounted on a pin 17 attached to the camera case 1 and located in the path of motion of a lug 9a. The lever 18 can move through an angle limited by the edges 1h, which are spaced apart by the widths of the lug 9a and the lever 18, so that the lug 9a comes to rest in exactly the same position whether the cable release is extended or retracted.

If the cable release is only partially extracted, the arm 13b of the lever 13 will not be able to pivot counterclockwise, because it is restrained by the lateral wall of the extension 2e of the annular groove 2d. Thus, not only will the shutter not be operated, but the photographer will realize that it has not been operated since he will have found it impossible to depress the button 7c. The button 7c can be depressed only when the cable release is either completely retracted or completely extended and when the ring 9 has reached its stop position defined by the lever 18 and in which the groove, or hole, 2f is opposite the lever arm 13b, so as to allow the latter to pivot.

What is claimed is:

1. A photographic camera comprising a camera case; a cable release which is permanently connected to the camera and which comprises a flexible cable member displaceably arranged in said camera case; channel in said camera case into which said flexible cable member is invisibly arranged and guided when the cable release is extended or retracted; a carrier member movable through a predetermined distance from a first position to a second position; a lever pivotally mounted on said carrier member; said flexible cable member being connected to said movable carrier member to move therewith; and a shutter and actuating means therefor, said lever engaging said actuating means only when said cable release is in said first position and when it is in said second position.

2. A photographic camera comprising a camera case; a cable release which is permanently connected to the camera and which comprises a flexible cable member displaceably arranged in said camera case; a lens on one side of said camera; a ring fixedly connected with said camera case and coaxial with said lens; an annular groove in said ring into which said flexible cable member is invisibly arranged and guided when the cable release is extended or retracted; a second ring rotatably mounted coaxially with said annular groove; a lever pivotally mounted on said second ring, said cable release being connected to said second ring to move therewith and to engage said lever; and a shutter and actuating means therefor, said lever engaging said actuating means when said cable release is extended and when it is retracted.

3. A photographic camera comprising a camera case; a cable release which is permanently connected to the camera and which comprises a push button and a flexible cable member displaceably arranged in said camera case; a lens on one side of said camera; a fixedly connected ring on said camera case coaxial with said lens; an annular groove in said ring into which said flexible cable member is guided when the cable release is extended or retracted; a second ring rotatably mounted coaxially with said annular groove; a lever pivotally mounted on said second ring and having an arm, said cable release being connected to said second ring to move therewith and to engage said lever; and a shutter and actuating means therefor, said arm of said lever engaging said actuating means when said cable release is extended and when it is retracted, said lever arm being pivoted radially when said push button is depressed.

4. A photographic camera comprising a camera case; a cable release which is permanently connected to the camera and which comprises a flexible cable member displaceably arranged in said camera case; a lens on one side of said camera; a ring fixedly connected with said camera case and coaxial with said lens; an annular groove in said ring into which said flexible cable member is invisibly arranged and guided when the cable release is extended or retracted; a second ring rotatably mounted coaxially with said annular groove, one end of said flexible cable member being connected to said second ring to rotate therewith to retract and extend said cable release; a stop engaging said second ring to permit rotation thereof through an angle of 360° from one limit of rotation of said second ring to the other; a lever pivotally mounted on said second ring, an inner longitudinally movable member in said cable release engaging said lever to move the same; and a shutter and actuating means therefor, said lever engaging said actuating means when said second ring is in either end of its range of rotation.

5. A photographic camera comprising a camera case; a cable release which is permanently connected to the camera and which comprises a handle and a flexible cable member displaceably arranged in said camera case; a channel in said camera case into which said flexible cable member is invisibly arranged and guided when the cable release is extended or retracted; a recess in said camera case, said cable release entering said camera case through said recess, said handle fitting into said recess and substantially closing said recess when said cable release is retracted; a catch holding said handle in said recess; a movable carrier member; a lever pivotally mounted on said carrier member; said flexible cable member being connected to said movable carrier member to move therewith; and a shutter and actuating means therefor, said lever engaging said actuating means when said cable release is extended and when it is retracted.

6. A photographic camera comprising a camera case; a cable release which is permanently connected to the camera and which comprises a handle and a flexible cable member displaceably arranged in said camera case; a channel in said camera case into which said flexible cable member is invisibly arranged and guided when the cable release is extended or retracted; a recess in said camera case, said cable release entering said camera case through said recess, said handle fitting into said recess and substantially closing said recess when said cable release is retracted; a catch holding said handle in said recess; a disk having a size substantially equal to the cross-sectional area of said recess and located in said recess; a spring pressing said disk toward the top of said recess to close said recess when said cable release is extracted; a movable carrier member; a lever pivotally mounted on said carrier member; said flexible cable member being connected to said movable carrier member to move therewith; and a shutter and actuating means therefor, said lever engaging said actuating means when said cable release is extended and when it is retracted.

References Cited by the Examiner
UNITED STATES PATENTS 2,132,549 10/1938 Wenstrom _____ 95—32
2,327,591 8/1943 Brueck _____ 95—63

JOHN M. HORAN, *Primary Examiner.*